United States Patent [19]
Tamura

[11] Patent Number: 5,940,617
[45] Date of Patent: Aug. 17, 1999

[54] DEBUGGER FOR CONTROLLING EXECUTION OF SOFTWARE INSTALLED IN OBJECT TO BE CONTROLLED ON THE BASIS OF STATE TRANSITION MODEL, DEBUGGING METHOD THEREOF, RECORD MEDIUM THEREOF, AND METHOD FOR CORRELATING FUNCTION SPECIFICATIONS AND CODE ADDRESSES

[75] Inventor: Kazuyoshi Tamura, Fuchu, Japan

[73] Assignee: Kabushiki Kaisha Toshiba, Kawasaki, Japan

[21] Appl. No.: 08/931,244

[22] Filed: Sep. 16, 1997

[30] Foreign Application Priority Data

Sep. 17, 1996 [JP] Japan .................................. P 8-245042

[51] Int. Cl.⁶ ...................................................... G06F 1/00
[52] U.S. Cl. ............................................ 395/704; 395/700
[58] Field of Search .................................... 395/704, 700, 395/183.16; 364/921

[56] References Cited

U.S. PATENT DOCUMENTS 4,802,116  1/1989  Ward et al. ............................ 364/921
5,175,856 12/1992  Dyke et al. ............................ 395/700
5,560,009  9/1996  Lenkov et al. ........................ 395/700
5,581,696 12/1996  Kolawa et al. .................... 395/183.14
5,778,230  7/1998  Wimble et al. ........................ 395/704

FOREIGN PATENT DOCUMENTS 7-168709  7/1995  Japan .
7-319730 12/1995  Japan .

*Primary Examiner*—Emanuel Todd Voeltz
*Assistant Examiner*—Chameli Das
*Attorney, Agent, or Firm*—Banner & Witcoff, Ltd.

[57] ABSTRACT

In a debug transition information file or a debug state information file, individual states and individual transitions have been correlated with addresses of an object code. While a program executing portion is executing a program, if a program stop command or the like is issued, a debugger executes the stop operation of the program with an address of the object code specified, based on the correlated results. Thus, the program can be more easily stopped or re-executed at any position in the function specifications. In addition, a state or a transition can be easily specified at any position of the program. When the function specifications have a hierarchical structure, the operation of the system can be easily checked.

21 Claims, 11 Drawing Sheets

STATE TRANSITION DIAGRAM 1

```
0001   STATE TRANSITION DIAGRAM 1:
0002   STATE 1A:
0003     if(EVENTE 1A){
0004     ACTION 1A;
0005     GOTO STATE 1C;
0006     }
0007     GOTO STATE 1A;
0008   STATE 1B:
0009     if(EVENTE 1C){
0010     ACTION 1C;
0011     GOTO STATE 1A;
0012     }
0013     if(EVENTE 1D){
0014     ACTION 1D;
0015     GOTO STATE 1D;
0016     }
0017     GOTO STATE 1B;
0018   STATE 1C:
0019     if(EVENTE 1B){
0020     ACTION 1B;
0021     GOTO STATE 1D;
0022     }
0023     GOTO STATE 1C;
0024   STATE 1D:
0025     if(EVENTE 1E){
0026     ACTION 1E;
0027     GOTO STATE 1B;
0028     }
0029     GOTO STATE 1D;
```

| STATE TRANSITION DIAGRAM NAME | POSITION OF TRANSITION | | SEQUENCE NUMBER OF SOURCE CODE |
|---|---|---|---|
| | BEGINNING STATE INFORMATION | EVENT INFORMATION | |
| STATE TRANSITION DIAGRAM 1 | STATE 1A | EVENT 1A | 1000 |
| STATE TRANSITION DIAGRAM 1 | STATE 1B | EVENT 1C | 2000 |
| STATE TRANSITION DIAGRAM 1 | STATE 1B | EVENT 1D | 2300 |
| STATE TRANSITION DIAGRAM 1 | STATE 1C | EVENT 1B | 3010 |
| STATE TRANSITION DIAGRAM 1 | STATE 1D | EVENT 1E | 4000 |

FIG. 4

| STATE TRANSITION DIAGRAM NAME | POSITION OF STATE | SEQUENCE NUMBER OF SOURCE CODE | LAYER |
|---|---|---|---|
| STATE TRANSITION DIAGRAM 1 | STATE 1A | 900 | 1 |
| STATE TRANSITION DIAGRAM 1 | STATE 1B | 1900 | 1 |
| STATE TRANSITION DIAGRAM 1 | STATE 1C | 3000 | 1 |
| STATE TRANSITION DIAGRAM 1 | STATE 1D | 3800 | 1 |

FIG. 5

| STATE TRANSITION DIAGRAM NAME | POSITION OF STATE | SEQUENCE NUMBER OF SOURCE CODE | LAYER |
|---|---|---|---|
| STATE TRANSITION DIAGRAM 2 | STATE 2A | 4200 | 1 |
| STATE TRANSITION DIAGRAM 2 | STATE 2B | 4300 | 1 |
| STATE TRANSITION DIAGRAM 3 | STATE 3A | 4650 | 2 |
| STATE TRANSITION DIAGRAM 3 | STATE 3B | 5050 | 2 |
| STATE TRANSITION DIAGRAM 2 | STATE 2C | 4500 | 1 |
| STATE TRANSITION DIAGRAM 4 | STATE 4A | 5120 | 2 |
| STATE TRANSITION DIAGRAM 4 | STATE 4B | 5210 | 2 |
| STATE TRANSITION DIAGRAM 4 | STATE 4C | 5400 | 2 |

FIG. 6B

| SEQUENCE NUMBER OF SOURCE CODE | ADDRESS OF OBJECT CODE |
|---|---|
| 1000 | 0001BC |
| 2000 | 0003CA |
| 2300 | 000586 |
| 3010 | 000A00 |
| 4000 | 00109F |

FIG. 7

| STATE TRANSITION DIAGRAM NAME | POSITION OF TRANSITION | | ADDRESS OF OBJECT CODE |
|---|---|---|---|
| | BEGINNING STATE INFORMATION | EVENT INFORMATION | |
| STATE TRANSITION DIAGRAM 1 | STATE 1A | EVENT 1A | 0001BC |
| STATE TRANSITION DIAGRAM 1 | STATE 1B | EVENT 1C | 0003CA |
| STATE TRANSITION DIAGRAM 1 | STATE 1B | EVENT 1D | 000586 |
| STATE TRANSITION DIAGRAM 1 | STATE 1C | EVENT 1B | 000A00 |
| STATE TRANSITION DIAGRAM 1 | STATE 1D | EVENT 1E | 00109F |

FIG. 8

| STATE TRANSITION DIAGRAM NAME | POSITION OF STATE | ADDRESS OF OBJECT CODE | LAYER |
|---|---|---|---|
| STATE TRANSITION DIAGRAM 1 | STATE 1A | 000100 | 1 |
| STATE TRANSITION DIAGRAM 1 | STATE 1B | 000310 | 1 |
| STATE TRANSITION DIAGRAM 1 | STATE 1C | 000980 | 1 |
| STATE TRANSITION DIAGRAM 1 | STATE 1D | 000F10 | 1 |

FIG. 9

ONE-STATE DESIGNATION MODE  41-->43-->42
TWO-STATE DESIGNATION MODE  41-->43-->45-->42
TRANSITION DESIGNATION MODE  41-->44-->42

> BECAUSE STATE WAS CHANGED FROM 1C TO 1D,
  THE PROGRAM WAS STOPPED.

```
STATE TRANSITION DIAGRAM 3   STATE 3A
STATE TRANSITION DIAGRAM 4   NOT EXECUTED
```

FIG. 17

DEBUGGER FOR CONTROLLING EXECUTION OF SOFTWARE INSTALLED IN OBJECT TO BE CONTROLLED ON THE BASIS OF STATE TRANSITION MODEL, DEBUGGING METHOD THEREOF, RECORD MEDIUM THEREOF, AND METHOD FOR CORRELATING FUNCTION SPECIFICATIONS AND CODE ADDRESSES

BACKGROUND OF THE INVENTION

1. Field of the Invention

The present invention relates to a debugger suitable for testing and debugging a program in the course of a software development, a debugging method thereof, a record medium thereof, and a method for correlating function specifications and code addresses.

2. Description of the Related Art

As is disclosed in Japanese Patent Laid-Open Application No. Hei 7-319730, with first correlation information that relates sequence numbers of a program to the corresponding positions (transitions) expressed by a combination of states and events in a state transition matrix, second correlation information that relates sequence numbers of the program to addresses of an object code, and third correlation information that relates the above stated positions in the state transition matrix and addresses of the object code, the software has been able to be executed with addresses of the object code as a pause position or as an execution start position.

In addition, as disclosed in Japanese Patent Laid-Open Application No. Hei 7-168709, the operation of a system corresponding to function specifications such as state transition diagrams described in a specification descriptive language is input from an inputting unit such as a keyboard. Thus, actual transitions in the specifications of the program are automatically displayed on a screen of such as a CRT. Consequently, the user can easily verify the appearance of the state transitions of the system.

However, in the method disclosed in Japanese Patent Laid-Open Application No. Hei 7-319730, the operation of the system is stopped and re-executed corresponding to the individual transitions on the state transition diagram. Thus, to stop the program in the case that any state is changed to a particular state, the user should troublesomely add stop information for all transitions.

In the method as disclosed in Japanese Patent Laid-Open Application No. Hei 7-168709, when there is a hierarchical or parallel description in a state chart, it is difficult to check the state of the overall system. In addition, since the program has a mechanism that informs the user of the current state, the operation of an object that does not have a mechanism that informs the user of the current state cannot be checked.

SUMMARY OF THE INVENTION

The present invention is made from the above-described point of view.

A first object of the present invention is to provide a debugger that allows a program to be more easily stopped and re-executed, a debugging method thereof, a record medium thereof, and a method for correlating function specifications and code addresses.

A second object of the present invention is to provide a debugger that allows a program on a state transition model basis to be easily tested and debugged, a debugging method thereof, a record medium thereof, and a method for correlating function specifications and code addresses.

A third object of the present invention is to provide a debugger that allows a plurality of stop conditions to be designated when any state on a state transition matrix of an object to be controlled is changed to a particular state, a debugging method thereof, a record medium thereof, and a method for correlating function specifications and code addresses.

A fourth object of the present invention is to provide a debugger that allows the state of an overall system to be easily checked even if a state transition matrix of an object to be controlled has a hierarchical or parallel description, a debugging method thereof, a record medium thereof, and a method for correlating function specifications and code addresses.

A fifth object of the present invention is to provide a debugger that allows a program to be easily stopped or re-executed at any position in function specifications and a state and a transition to be easily specified at any position of the program, a debugging method thereof, a record medium thereof, and a method for correlating function specifications and code addresses.

A first aspect of the present invention is an apparatus for generating an intermediate code corresponding to function specifications represented by states and transitions thereof and for debugging a program corresponding to the intermediate code, comprising a correlating means for correlating the states and the transitions with addresses of the intermediate code, and an executing means for, in the case where a predetermined control command is issued during the execution of said program, specifying an address of the intermediate code based on the result of the correlating means and executing said predetermined control command.

A second aspect of the present invention is a method for generating an intermediate code corresponding to function specifications represented by states and transitions thereof and for debugging a program corresponding to the intermediate code, comprising the steps of correlating the states and the transitions with addresses of the intermediate code, and, in the case where a predetermined control command is issued during the execution of said program, specifying an address of the intermediate code based on the correlated result and executing said predetermined control command.

A third aspect of the present invention is a record medium storing a debugging program for generating an intermediate code corresponding to function specifications represented by states and transitions thereof and for debugging a program corresponding to the intermediate code, the program comprising the functions of correlating the states and the transitions with addresses of the intermediate code, and, in the case where a predetermined control command is issued during the execution of said program, specifying an address of the intermediate code based on the result of the correlating function and executing said predetermined control command.

The predetermined control command includes a command issued in the course of debugging, the command being a program stop command or a program re-execution command with said state or said transition specified.

The predetermined control command includes a command issued in the course of debugging, the command being a displaying command of said state or of the transition in operation.

When the function specifications are represented with a tree structure chained from a parent to a child, the tree structure is traced back from a leaf to a root, so that the states that are passed on tracing can be expressed as executing states in the function specification and that the other states can be expressed as not-executing states therein. Thus, when the function specifications have a hierarchical structure, the operation of the system corresponding to the function specifications can be easily checked.

A fourth aspect of the present invention is characterized, in the process of generating a source code and an object code from function specifications represented by states and transitions thereof, for comprising the steps of (a) correlating the states and the transitions with sequence numbers of the source code when the source code is generated, (b) correlating the sequence numbers of the source code with addresses of the object code when the object code is generated, and (c) correlating the states and the transitions with the addresses of the object code corresponding to the results correlated by the step (a) and the step (b).

According to the present invention, since individual states and individual transitions are correlated with addresses of the object code before an operation, the program can be more easily stopped or re-executed at any position of the function specifications. In addition, the state and transition can be easily specified at any position of the program.

According to the present invention, to stop an object to be controlled in the case that any state on the state transition matrix is changed to a particular state, the user can designate any mode from the three types of modes: a onestate designation mode, a two-state designation mode, and a transition designation mode. Therefore, the user does not need to add stop information to all transitions from any state to a particular state.

In addition, according to the present invention, since information corresponding to both state information and transition information is referenced, the program of the object to be controlled can be easily executed or stopped at any position of the function specifications. Moreover, the state and the transition of the object can be easily specified at any position of the program.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 4 is a table showing an example of transition information according to the embodiment of the present invention;

FIG. 5 is a table showing an example of state information according to the embodiment of the present invention;

FIG. 6A, FIG. 6B and FIG. 6C are schematic diagrams showing a hierarchy according to the embodiment of the present invention;

FIG. 7 is a table showing an example of compiler output information according to the embodiment of the present invention;

FIG. 8 is a table showing an example of debug transition information according to the embodiment of the present invention;

FIG. 9 is a table showing an example of debug state information according to the embodiment of the present invention;

FIG. 17 is a schematic diagram showing a state reference of function specifications having a hierarchical structure according to the embodiment of the present invention.

DESCRIPTION OF PREFERRED EMBODIMENTS

Next, with reference to the accompanying drawings, the embodiment of the present invention will be described.

Figure 1:
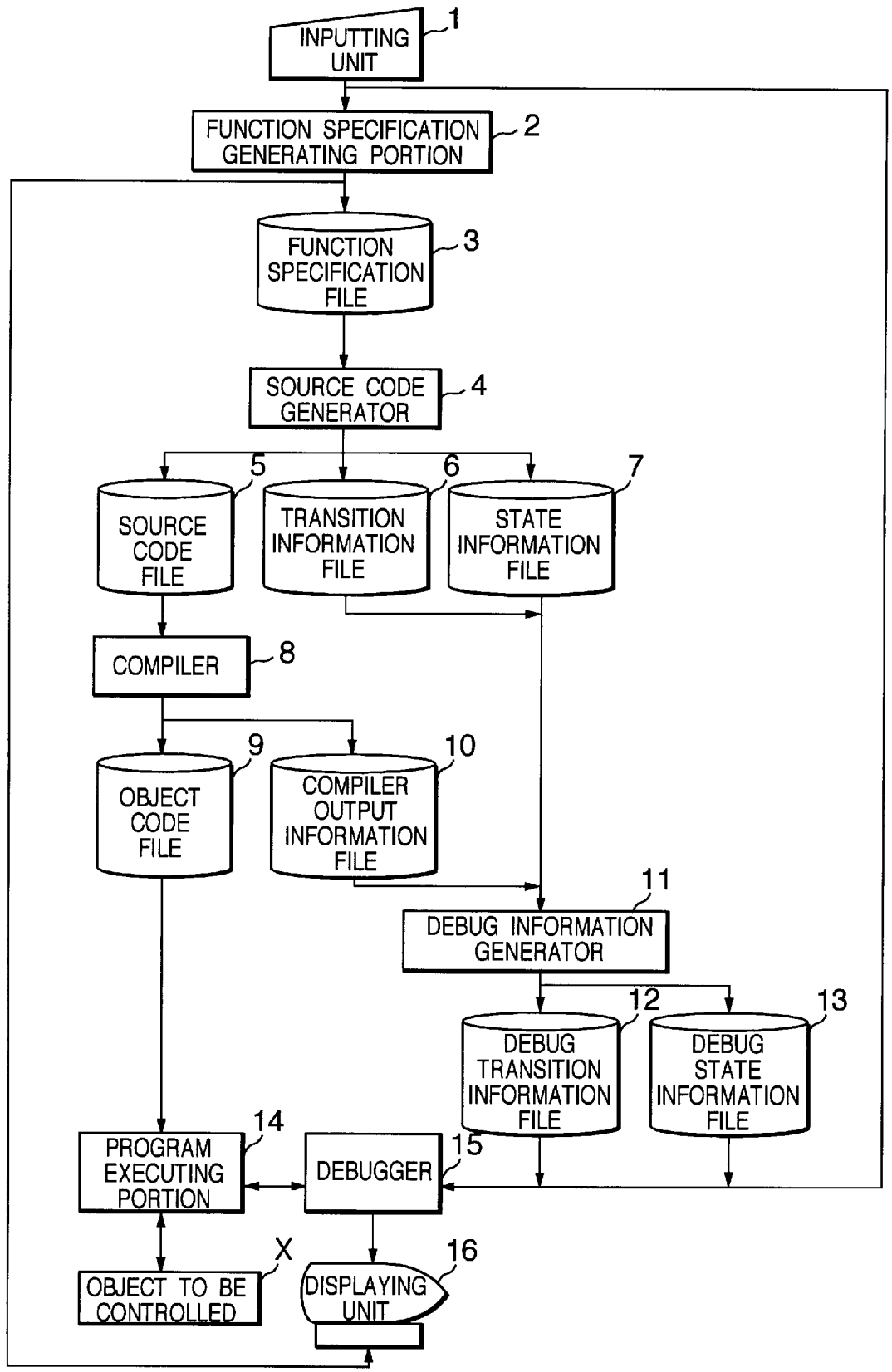
FIG. 1 is a block diagram showing the structure of a program debugging apparatus according to an embodiment of the present invention.

FIG. 1 shows the structure of a program debugging apparatus according to the embodiment of the present invention. The apparatus is accomplished on a computer. Each function of the apparatus is accomplished by making the computer operate according to the procedure expressed in the form of a program. Thus, the apparatus is described assuming a virtual circuit block having each function of the apparatus.

The apparatus shown in FIG. 1 controls an object X to be controlled such as an elevator. Reference numeral 1 is an inputting unit such as a keyboard and a mouse that deals with software for describing function specifications of the object to be controlled on a state transition model basis, and that is used for inputting function specifications and for operating the debugger.

A function specification generating portion 2 is a graphical specification describing editor that controls an inputting operation of the function specifications received from the inputting unit 1. The function specifications that have been input are stored in a function specification file 3.

A source code generator 4 generates a source code, transition information, and state information from the function specifications of the function specification file 3. The generated source code, transition information, and state information are stored in a source code file 5, a transition information file 6, and a state information file 7, respectively.

A compiler 8 generates compiler output information that is data that correlates the object code that defines the sequence that controls an object to be controlled, individual lines of the source code with addresses of the object code from the source code stored in source code file 5. The object code and the compiler output information are stored in an object code file 9 and a compile output information file 10, respectively.

A debug information generator 11 generates debug transition information that is correlation data of individual transitions and addresses of the object code and debug state information that is correlation data of individual states and addresses of the object code from the transition information 6 stored in the transition information file, the state information stored in the state information file 7, and the compiler output information stored in the compiler output information file 10. The debug transition information and the debug state information are stored in a debug transition information file 12 and a debug state information file 13, respectively.

A program executing portion 14 successively interprets and executes the object code stored in the object code file 9 and controls the object X to be controlled.

A debugger 15 performs various tests including by stopping and re-starting the program executing portion 14.

Information that has been obtained by the debugger 15 is output to a displaying unit 16.

Figures 2, 3:
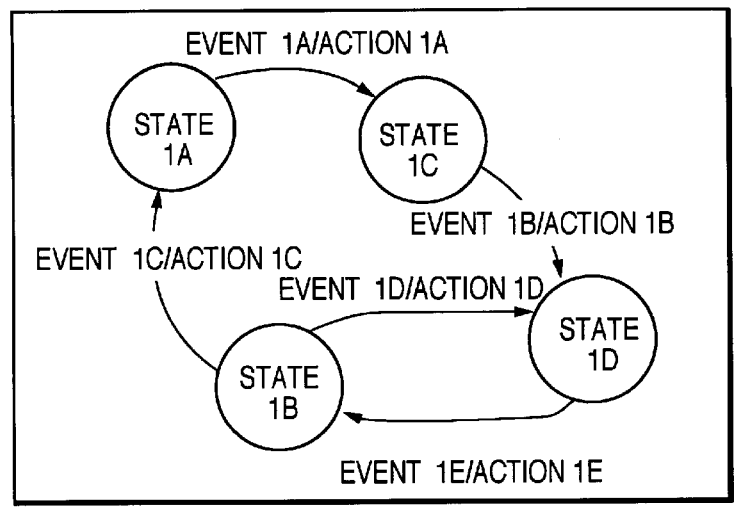
FIG. 2 is a schematic diagram showing an example of function specifications according to the embodiment of the present invention.
FIG. 3 is a schematic list showing an example of part of a source code and the source code line number according to the embodiment of the present invention.

FIG. 2 shows an example of the above-described function specifications. The function specifications are in a format of a state transition model such as a state transition diagram.

Based on this function specifications, a source code as shown in FIG. 3 is generated by the source code generator 4, the conventional techniques. In FIG. 3, "state transition diagram 1" represents the beginning of the process in the state transition diagram. "State 1A:", "state 1B:", "state 1C:", and "state 1D:" each represent the beginning of the process of the state in the state transition diagram. A statement beginning with "if" represents the beginning of the process corresponding to each transition.

Transition information correlates the state transition diagram name, the beginning state being the starting point of each transition in the state transition diagram, event information, and the corresponding sequence number (line number) of the source code as shown in FIG. 4. The transition information is structured in the form of diagram where the beginning state corresponding to the transition of an "if" statement is related to event and a sequence number in the source code.

The state information, as shown in FIG. 5, correlates the state transition diagram names, the position of the individual states in the state transition diagram, the sequence numbers of the source code of the individual states, and the layers of the state transition diagram. In the course of generating the state information, state information is generated by depth first search of state transition diagrams from the highest level to the lowest level. Then, layer numbers that are used for clearly showing the sequence of layer are sequentially assigned in the ascending order (for example, 1, 2, . . . ).

Figure 6A:
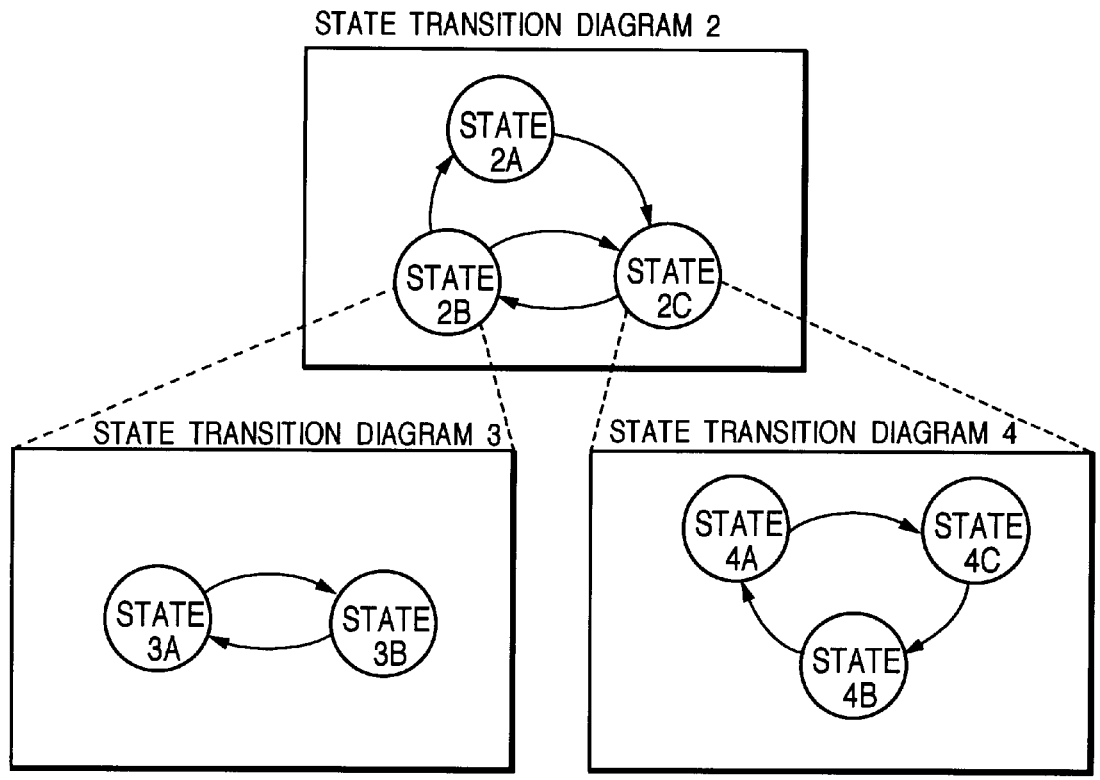
Figure 6C:
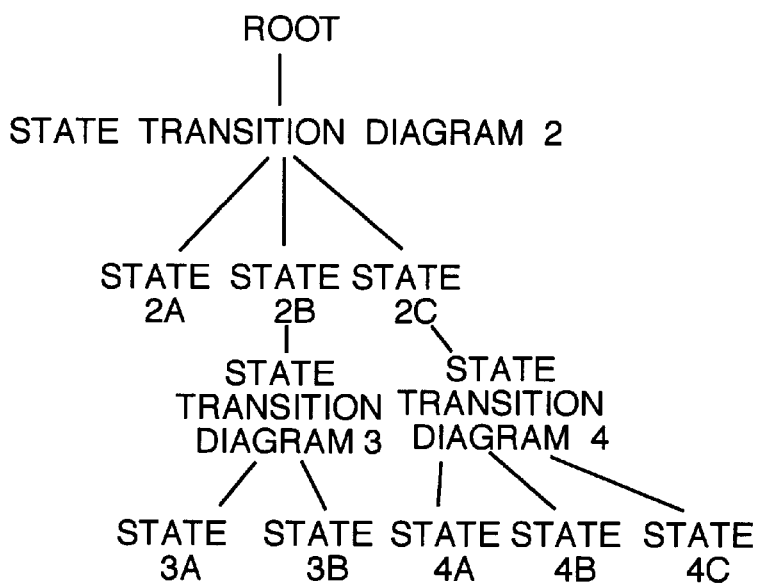

When the function specifications have a hierarchical structure, the function specifications, state information, and data structure are as shown in FIGS. 6A, 6B, and 6C, respectively. In other words, the states 2B and 2C, being at the lower state in the hierarchical structure, have their state information corresponding to state transition diagrams 3 and 4 in FIG. 6A, respectively. The state information is accomplished as data having a tree structure chained from a patent to a child as shown in FIG. 6C.

FIG. 7 is a table showing an example of compiler output information. The compiler output information correlates sequence numbers of a source code and addresses of an object code. The compiler output information is accomplished by a conventional debug information adding function of the compiler.

FIG. 8 is an example of the debug transition information. The debug transition information is generated by correlating the transition information and the compiler output information.

FIG. 9 is a table showing an example of the debug state information. The debug state information is generated by correlating the state information and the compiler output information.

Figure 10:
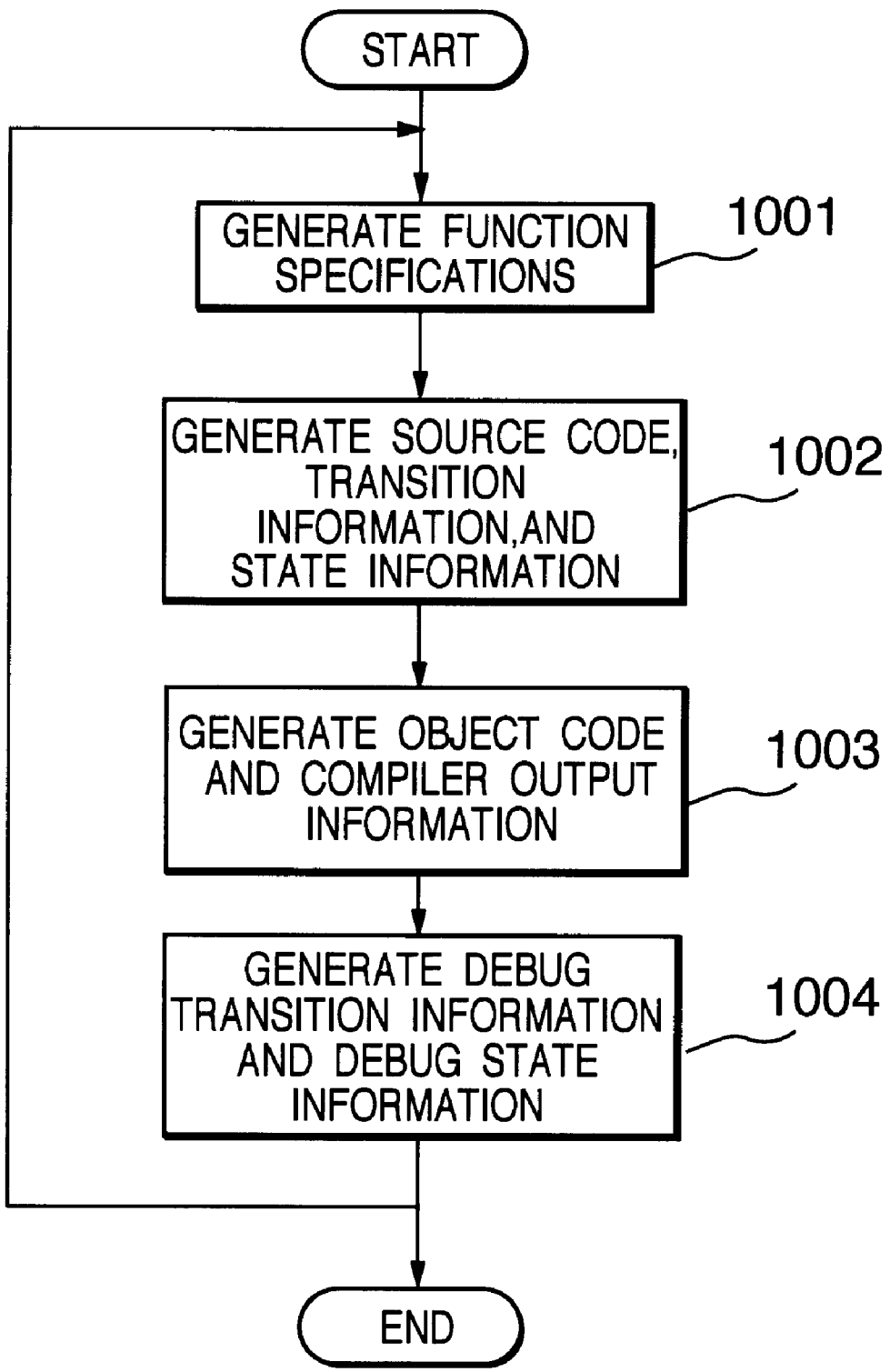
FIG. 10 is a flow chart showing a preparing operation for a debugging operation according to the embodiment of the present invention.

In the apparatus structured as shown in FIG. 1, software is input and an object code and debug information are generated as shown in FIG. 10.

Generating Function Specifications (at step 1001)

In the embodiment, software is input on a state transition model basis. In other words, the user inputs function specifications to the apparatus with the inputting unit 1. At this point, the function specification generating portion 2 controls the inputting operation of the function specifications expressed corresponding to the state transition model. The function specifications that have been input are stored in the function specification file 3.

Generating Source Code, Transition Information, and State Information (at step 1002)

The source code, transition information, and state information are generated by the software that has been input and stored in the above-stated manner. In other words, the source code, transition information, and state information are generated from data stored in the function specification file 3 by the source code generator 4.

Generating Object Code and Compiler Output Information (at step 1003)

The object code and the compiler output information are generated from the source code as gained in the above-stated manner. In other words, the object code and the compiler output information are generated from the source code by the compiler 8.

Generating Debug Transition Information and Debug State Information (at step 1004)

The debug transition information and the debug state information are generated from the transition information, state information, and compiler output information as gained in the above-stated manner. In other words, the debug transition information and the debug state information are generated as debug information by the debug information generator 11 from the transition information, the state information and the compiler output information.

Figure 11:
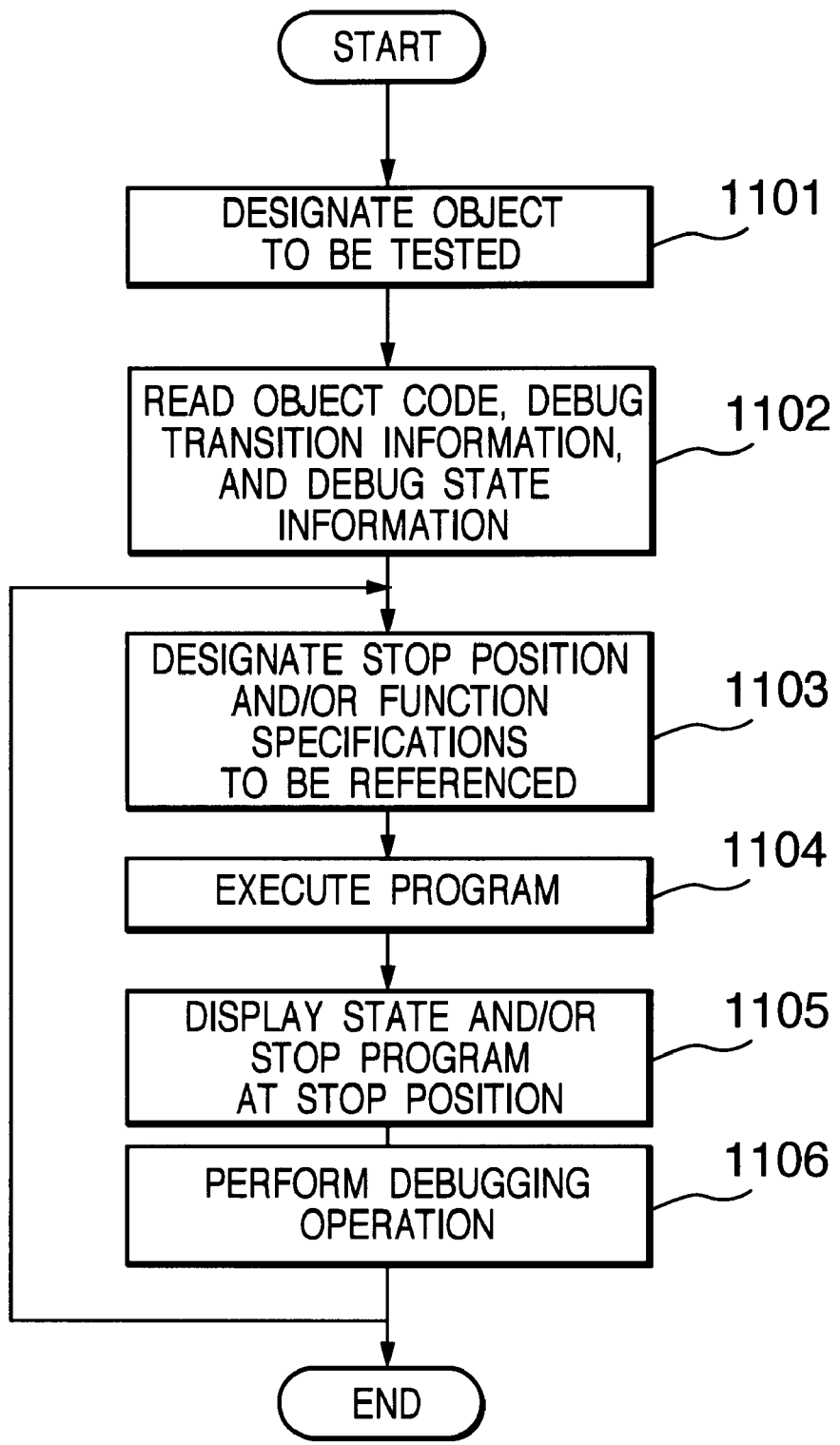
FIG. 11 is a flow chart showing a debugging operation according to the embodiment of the present invention.

FIG. 11 is a flow chart showing a test-debugging process.

The object code, the debug transition information, and the debug state information generated by the process shown in FIG. 10 are test-debugged in the following manner.

First of all, the user designates an object to be tested (at step 1101). The program executing portion 14 reads the object code from the object code file 9. At the same time, the debugger 15 reads the debug transition information from the debug transition information file 12 and the debug state information from the debug state information file 13 (at step 1102). When the user designates the execution of the program, the program executing portion 14 interprets and executes the object code from the beginning address so as to control the object X.

Figures 12, 13:
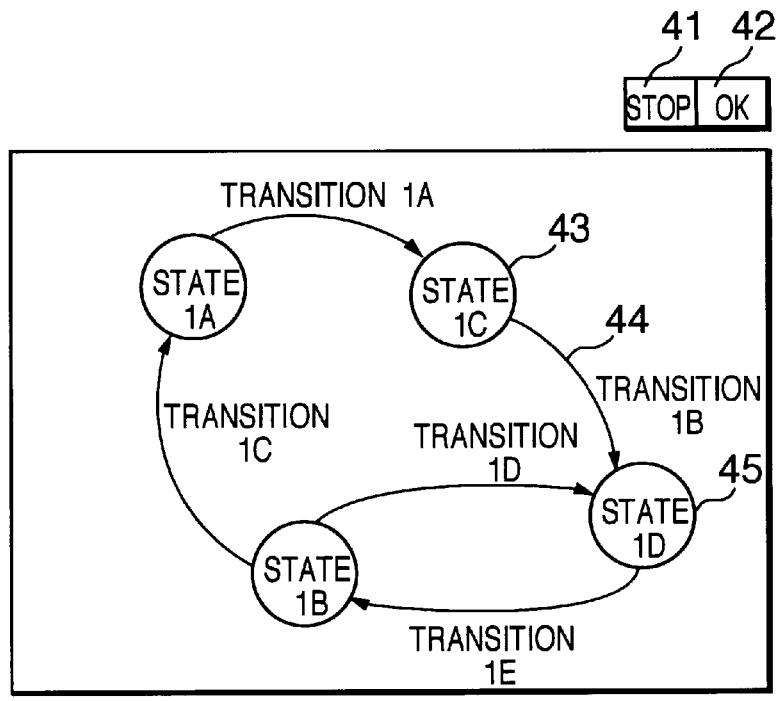
FIG. 12 is a schematic diagram showing an example of a stop information inputting operation according to the embodiment of the present invention.
FIG. 13 is a schematic diagram showing an example of a display in the stop state according to the embodiment of the present invention.

Stopping the execution of the object code in the middle is accomplished, as shown in FIG. 12, by designating the stop mode from the following three types of modes: a one-state designation mode that causes the execution to be stopped in the case that a transition to a particular state is performed; a two-state designation mode that causes the execution to be stopped in the case that a transition from a particular state to another state is performed; and a transition designation mode that causes the execution to be stopped in the case that a particular transition is performed (at step 1103). In other words, as shown in FIG. 12, stop information inputting operation is started by pressing the stop button; the stop mode and the stop position are specified by pressing the OK button.

After the stop position is designated, the program is executed (at step 1104). In the one-state designation mode, the debugger 15 issues a stop command to the program executing portion 14 based on the debug state information of the debug state information file 13 when the program is executed at an address that represents a designated state of the function specifications. In the two-state designation mode, the debugger 15 issues a stop command to the program executing portion 14 based on the debug transition information of the debug transition information file 12 when the program is executed at an address that represents a designated transition between states of the function specifications. In the transition designation mode, the debugger 15 issues a stop command to the program executing portion 14 based on the debug transition information of the debug transition information file 12 when the program is executed at an address that represents a designated transition. The program executing portion 14 stops the program at the designated address (at step 1105). The result is output on the displaying unit 16 as shown in FIG. 13.

Figure 14:
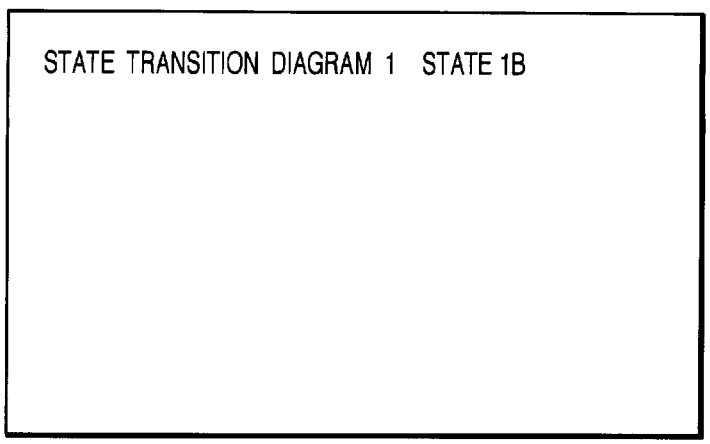
FIG. 14 is a schematic diagram showing an example of an output of debug information according to the embodiment of the present invention.
Figure 15:
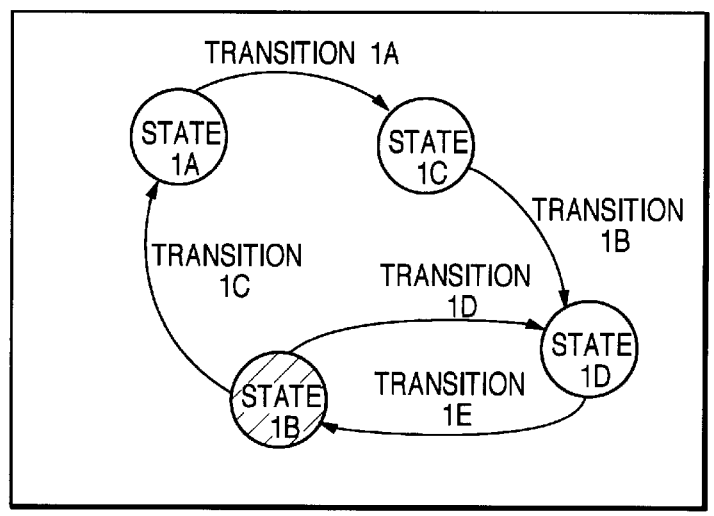
FIG. 15 is a schematic diagram showing an example of debug information according to the embodiment of the present invention.

To check only a change of a state without stopping the operation of the program, function specifications whose state is to be referenced should be designated by the debugger 15 (at step 1103). Then, text information as shown in FIG. 14 or information on a state transition model basis as shown in FIG. 15 is displayed on the displaying unit 16 (at step 1105). In this example, the "state transition diagram 1" is designated and the "state 1B" is displayed as the current position of the program.

Figure 16:
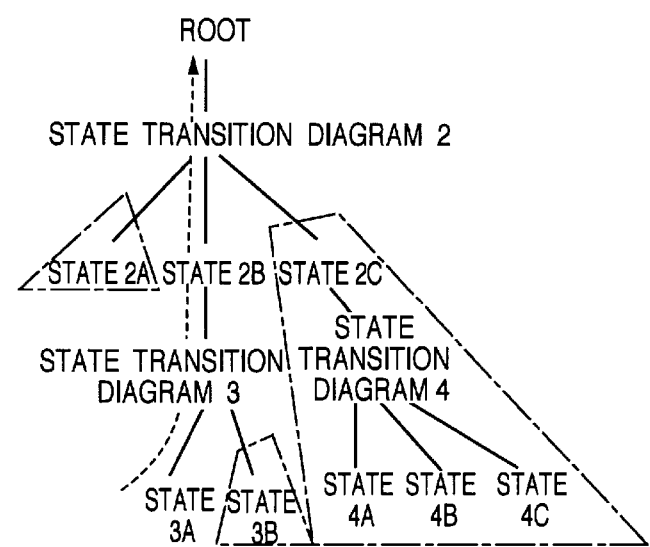
FIG. 16 is a schematic diagram showing an example of a depth first search operation according to the embodiment of the present invention.

In the case that the function specifications have a hierarchical structure as shown in FIG. 6, when the program is executed at an address corresponding to a leaf of the debug state information, a state that can be traced back from the leaf is referred to as "current each state of function specifications". As to the function specifications existing in a partial tree below the state other than the concurrent state in the function specifications to be passed in tracing, the states are referred to as "not executing". In the example shown in FIG. 16, states are traced back from a state 3A that is a leaf of a tree structure to a root in the path as denoted by a dotted line, so that the passed states 2B and 3A are referred to as "current states". The other function specifications included in the partial tree except for the current states (the portion denoted as a dashed line) are referred to as "not executing". The displaying unit 16 only displays the designated information. When the "state transition diagram 3" and the "state transition diagram 4" are designated to be displayed, information is displayed on displaying unit 16 as shown in FIG. 17 at the instant when the program is executed at the address corresponding to the "state 3A" in the object code. When the "state transition diagram 2" is designated, not only "state 3A" but also "state 2B" which is traced back from this state 3A is displayed on the displaying unit 16.

The user performs various debugging operations based on the information displayed on the displaying unit 16 (at step 1106).

The present invention is not limited to the above-described embodiment. Instead, within the scope of the technical art of the present invention, various modifications can be made.

For example, in the above-described embodiment, a state transition diagram is used as description of function specifications. However, according to the present invention, as long as function specifications are described in a description format on a state transition model basis such as a state transition table and state transition matrix, the format is not limited.

In addition, in the above-described embodiment, the inputting unit 1 (such as the keyboard) and the displaying unit 16 are used. However, as an inputting means and a displaying means, a portable terminal unit can be used. For example, for an object to be controlled (such as an elevator), in addition to the program debugging unit, an interface with the portable terminal may be provided. Thus, at a site, checking the operation in the maintenance work of the object can be easily performed. Consequently, since the maintenance time can be reduced, the rate of operation can be improved.

Moreover, instead of or in addition to the inputting unit 1, an external storing unit such as a floppy disk drive may be provided. In this case, an operation sequence from the inputting unit 1 into the debugger 15 is generated by a test data generating system such as an editor. The data is stored on a floppy disk, which an officer in charge of a test brings to the site where controllable object is installed. With the floppy disk, the test data can be sequentially executed at the site. Thus, when the same test is performed with a similar machine, the operation can be easily checked.

The object to be controlled of the present invention is not limited to an elevator. Instead, the present invention can be applied to various objects such as a power plant, a power distribution facility, a communication system, a chemical plant, and an automation production line and the like. In addition, the object to be controlled of the software of the present invention is not limited to a tangible substance such as the facilities stated above. Instead, the present invention can be applied to various intangible substances such as data files of computers and various tasks of multi-task computer systems and the like.

The program debugging apparatus of the above-described embodiment is accomplished on a computer. However, all or part of such functions can be accomplished on electronic circuits.

As described above, according to the present invention, in the case that the function specifications of the system are described by a state transition model, through comprehending the current state of the system and performing various debugging processes more efficiently, the operation of the function specifications can be easily performed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An apparatus for generating an intermediate code with a first code and a second code based on function specifications expressed as states and transitions thereof and for debugging a program corresponding to the intermediate code, comprising:

correlating means for correlating said states and said transitions with addresses of the intermediate code, said correlating means comprising:

(a) means for correlating the states and the transitions with sequence numbers of the first code when the first code is generated;

(b) means for correlating said sequence numbers of the first code with addresses of the second code when the second code is generated; and (c) means for correlating said states and said transitions with the addresses of the second code based on the results correlated by said means (a) and said means (b); and executing means for specifying an address of said intermediate code based on the result of said correlating means and for executing a predetermined control command issued during the execution of said program.

2. The apparatus as set forth in claim 1, wherein said predetermined control command is a command that is issued in the course of debugging, the command being a program stop command or a program re-execution command with said state or said transition specified.

3. The apparatus as set forth in claim 2, wherein one of a one-state designation mode, a two-state designation mode, and a transition designation mode is selected so as to stop the program, where the one-state designation mode stops the execution of the program in the case that a transition to a particular state of said function specifications is performed, the two-state designation mode stops the execution of the program in the case that a transition from a particular state to another state is performed, and the transition designation stops the execution of the program in the case that a predetermined transition is performed.

4. The apparatus as set forth in claim 1, wherein said predetermined control command is a command that is issued in the course of debugging, the command being a state displaying command or a transition displaying command.

5. The apparatus as set forth in claim 4, wherein said function specifications are expressed as a tree structure chained from a parent to a child, and wherein the tree structure is traced back from a leaf to a root, states that are traced are displayed as executing states, the other states are displayed as not-executing states.

6. The apparatus as set forth in claim 4, wherein a state or a transition of which the program is being executed following the predetermined control command is displayed on a portable terminal unit.

7. The apparatus as set forth in claim 1, wherein said executing means comprises:

means for specifying an address of said second code based on the result, correlated by said means (c) and for executing a predetermined control command issued during the execution of said program.

8. A method for generating an intermediate code with a first code and a second code based on function specifications expressed as states and transitions thereof and for debugging a program corresponding to the intermediate code, comprising the steps of:

correlating said states and said transitions with addresses of the intermediate codes comprising the steps of:

(a) correlating the states and the transitions with sequence numbers of the first code when the first code is generated;

(b) correlating said sequence numbers of the first code with addresses of the second code when the second code is generated; and (c) correlating said states and said transitions with the addresses of the second code based on the results correlated by the step (a) and the step (b); and specifying an address of said intermediate code corresponding to said correlated result and executing a predetermined control command issued during the execution of the program.

9. The method as set forth in claim 8, wherein said predetermined control command is a command that is issued in the course of debugging, the command being a program stop command or a program re-execution command with said state or said transition specified.

10. The method as set forth in claim 9, wherein one of a one-state designation mode, a two-state designation mode, and a transition designation mode is selected so as to stop the program, where the one-state designation mode stops the execution of the program in the case that a transition to a particular state of said function specifications is performed, the two-state designation mode stops the execution of the program in the case that a transition from a particular state to another state is performed, and the transition designation stops the execution of the program in the case that a predetermined transition is performed.

11. The method as set forth in claim 8, wherein said predetermined control command is a command that is issued in the course of debugging, the command being a state displaying command or a transition displaying command.

12. The method as set forth in claim 11, wherein said function specifications are expressed as a tree structure chained from a parent to a child, and wherein the tree structure is traced back from a leaf to a root, states that are traced are displayed as executing states, the other states are displayed as not-executing states.

13. The method as set forth in claim 11, wherein a state or a transition of which the program is being executed following the predetermined control command is displayed on a portable terminal unit.

14. The method as set forth in claim 8, wherein the executing step comprises the step of:

specifying an address of said second code based on the results correlated by the step (c) and executing a predetermined control command issued during the execution of the program.

15. A record medium storing a debugging program for generating an intermediate code with a first code and a second code based on function specifications expressed as states and transitions thereof and for debugging a program corresponding to the intermediate code, the program comprising the functions of:

correlating said states and said transitions with addresses of the intermediate code, said correlating function comprising:

(a) correlating the states and the transitions with sequence numbers of the first code when the first code is generated;

(b) correlating said sequence numbers of the first code with addresses of the second code when the second code is generated; and (c) correlating said states and said transitions with the addresses of the second code based on the results correlated by the function (a) and the function (b); and specifying an address of said intermediate code corresponding to said result of the correlating function and executing a predetermined control command issued during the execution of the program.

16. The record medium as set forth in claim 15, wherein said predetermined control command is a command that is issued in the course of debugging, the command being a program stop command or a program re-execution command with said state or said transition specified.

17. The record medium as set forth in claim 15, wherein said predetermined control command is a command that is issued in the course of debugging, the command being a state displaying command or a transition displaying command.

18. The record medium as set forth in claim 17, wherein said function specifications are expressed as a tree structure chained from a parent to a child, and wherein the tree structure is traced back from a leaf to a root, states that are traced are displayed as executing states, the other states are displayed as not-executing states.

19. The record medium as set forth in claim 15, wherein the executing function comprises the function of:

specifying an address of said second code based on the results correlated by the function (c) and executing a predetermined control command issued during the execution of the program.

20. A method for correlating function specifications expressed as states and transitions thereof with code addresses so as to generate a first code and a second code from said function specifications, comprising the steps of:

(a) correlating the states and the transitions with sequence numbers of the first code when the first code is generated;

(b) correlating said sequence numbers of the first code with addresses of the second code when the second code is generated; and (c) correlating said states and said transitions with the addresses of the second code based on the results correlated by the step (a) and the step (b).

21. An apparatus for generating an intermediate code with a first code and a second code based on function specifications expressed as states and transitions thereof and for debugging a program corresponding to the intermediate code, comprising:

a correlator for correlating said states and said transitions with addresses of the intermediate code, said correlator comprising:

(a) a first correlator for correlating the states and the transitions with sequence numbers of the first code when the first code is generated;

(b) a second correlator for correlating said sequence numbers of the first code with addresses of the second code when the second code is generated; and (c) a third correlator for correlating said states and said transitions with the addresses of the second code based on the results correlated by said first correlator and said second correlator; and an executor for specifying an address of said intermediate code based on the result of said correlator and executing a predetermined control command issued during the execution of said program.

* * * * *